(12) United States Patent
Watanabe

(10) Patent No.: US 7,023,484 B2
(45) Date of Patent: Apr. 4, 2006

(54) EXPOSURE CONTROL APPARATUS AND METHOD THEREOF

(75) Inventor: Toshiaki Watanabe, Miyagi (JP)

(73) Assignee: Ricoh Company, Ltd., Tokyo (JP)

( * ) Notice: Subject to any disclaimer, the term of this patent is extended or adjusted under 35 U.S.C. 154(b) by 912 days.

(21) Appl. No.: 09/839,294

(22) Filed: Apr. 23, 2001

(65) Prior Publication Data

US 2002/0012065 A1   Jan. 31, 2002

(30) Foreign Application Priority Data

Apr. 27, 2000  (JP) ............................ 2000-128284

(51) Int. Cl.
*H04N 5/238* (2006.01)
*H04N 5/235* (2006.01)

(52) U.S. Cl. ...................... 348/364; 348/363; 348/362

(58) Field of Classification Search ................ 348/234, 348/363, 672, 364, 255, 229.1, 350, 362; 396/236, 234; 358/518
See application file for complete search history.

(56) References Cited

U.S. PATENT DOCUMENTS

| | | | | |
|---|---|---|---|---|
| 5,128,769 A * | 7/1992 | Arai et al. | ............... | 348/363 |
| 5,184,172 A * | 2/1993 | Miyazaki | ............... | 396/234 |
| 5,258,848 A * | 11/1993 | Kondo et al. | ............ | 348/229.1 |
| 5,353,058 A * | 10/1994 | Takei | ............... | 348/363 |
| 5,517,333 A * | 5/1996 | Tamura et al. | ............. | 358/518 |
| 5,703,644 A * | 12/1997 | Mori et al. | ............... | 348/363 |
| 5,712,682 A * | 1/1998 | Hannah | ............... | 348/255 |
| 5,745,808 A * | 4/1998 | Tintera | ............... | 396/236 |
| 5,808,697 A * | 9/1998 | Fujimura et al. | ........... | 348/672 |
| 6,124,891 A * | 9/2000 | Homma et al. | ............ | 348/364 |
| 6,636,262 B1 * | 10/2003 | Okajima et al. | ........... | 348/350 |
| 6,665,010 B1 * | 12/2003 | Morris et al. | .............. | 348/297 |
| 6,690,424 B1 * | 2/2004 | Hanagata et al. | .......... | 348/364 |

FOREIGN PATENT DOCUMENTS

| | | |
|---|---|---|
| JP | 5-122600 | 5/1993 |
| JP | 7-298131 | 11/1995 |

* cited by examiner

*Primary Examiner*—Lin Ye
(74) *Attorney, Agent, or Firm*—Oblon, Spivak, McClelland, Maier & Neustadt, P.C.

(57) ABSTRACT

The exposure control apparatus comprises screen divider which divides the screen into a many areas, and high luminance decider which decides, for each area of the screen, whether a main subject having a high luminance exists within that area. Further, average luminance calculator calculates average luminance in that area of the screen which is decided as including the main subject, and exposure value determiner determines the exposure value based on the calculated average luminance.

8 Claims, 10 Drawing Sheets

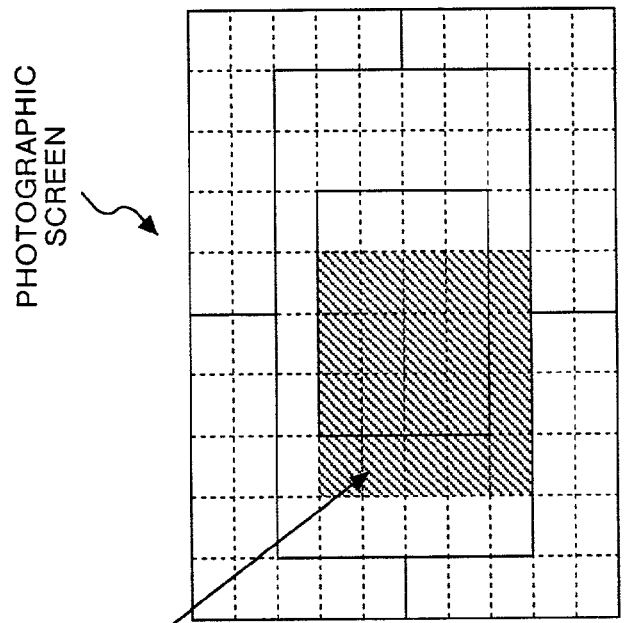
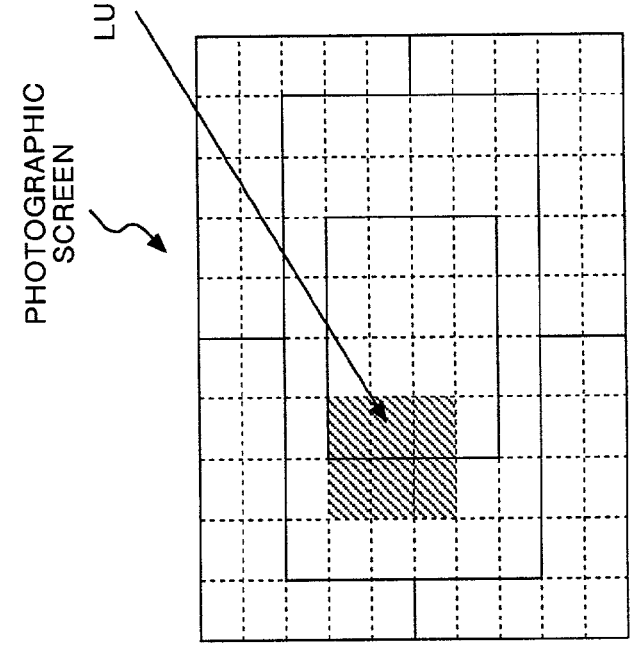

HIGH LUMINANCE PORTION

HIGH LUMINANCE PORTION

HIGH LUMINANCE PORTION

HIGH LUMINANCE PORTION

HIGH LUMINANCE PORTION

EXPOSURE CONTROL APPARATUS AND METHOD THEREOF

FIELD OF THE INVENTION

The present invention relates to an exposure control apparatus and method thereof for determining a value of the exposure ("exposure value") based on the luminance of the screen ("photographic screen") so as to perform exposure control based on the determined exposure value. More particularly, this invention relates to an exposure control apparatus and method thereof capable of performing proper exposure control even when the luminance of a main subject is high.

BACKGROUND OF THE INVENTION

In an image pickup apparatus such as a digital still camera or a digital video camera, exposure controlling technique for automatically adjusting appropriate exposure has been conventionally known as the technique for preventing a phenomenon that an exposed image becomes utterly dark due to under-exposure or an exposed image becomes utterly light due to over-exposure.

This exposure controlling technique is adapted to determine an exposure value (i.e., the combination of an aperture opening degree and a shutter speed) at which the best exposure result can be obtained based on the luminance of a subject and the sensitivity of the charge pickup device (a charge-coupled device, or a CCD). In general, the average luminance of a photographic screen is calculated through a photographic lens, and then, the subject is exposed at a high exposure value in such a manner that an exposed image is prevented from being utterly light when the average luminance is high (i.e., the subject is light); and in contrast, the subject is exposed at a low exposure value in such a manner that the exposed image is prevented from being utterly dark when the average luminance is low (i.e., the subject is dark).

Here, systems for calculating the average luminance of the photographic screen include an averaging metering system for calculating the average luminance of the entire photographic screen; a center-weighted metering system for calculating the average luminance by placing prime importance on the luminance at the center of the photographic screen; a spot metering system for calculating the average luminance by using only the luminance of a specified portion of the photographic screen; a multi-pattern metering system for calculating the average luminance by using a pattern analysis based on pieces of luminance information on a plurality of portions, into which the photographic screen is divided; and the like.

As illustrated in FIG. 10A, when the average luminance of the photographic screen is calculated by using the luminance of a portion illuminated with a spotlight when the spotlight having a luminance much higher than that of the surroundings thereof is included within the photographic screen, a high average luminance is obtained, and therefore, an exposure value also becomes high. In an exposed image in this case, the image around the spotlight (a subject) becomes dark due to under-exposure although the portion of the spotlight can be prevented from becoming utterly light, as illustrated in FIG. 10B.

In order to prevent the entire exposed image from becoming dark by the under-exposure due to the brightness of a part of the photographic screen in the above-described case, high luminance cutting is carried out in the above-described metering system. A pixel having a luminance higher than a predetermined luminance threshold on the photographic screen (hereinafter referred to as "a high luminance pixel") is subjected to high luminance cutting, so that the luminance of the high luminance pixel is converted into a predetermined low luminance equal to or lower than the luminance threshold, and then, the average luminance is calculated.

With this prior art, the average luminance of the photographic screen is calculated by using the low luminance after the conversion, so that an exposure value also becomes low. Consequently, it is possible to prevent the entire exposed image from being exposed at under-exposure due to the brightness of a part of the photographic screen.

However, since the luminance of the high luminance pixel is uniformly converted into the predetermined low luminance equal to or lower than the luminance threshold in the above-described prior art, there is an inevitable limit to correct exposure control.

Namely, in the above-described prior art, the luminance of the high luminance pixel is converted into the predetermined low luminance equal to or lower than the luminance threshold even when a high luminance portion consisting of the high luminance pixels on the photographic screen is to be exposed as a main subject, and therefore, the exposure value also becomes low. Therefore, when the image is exposed at the low exposure value, hollows occur at the high luminance portion, thereby arising a problem that the correct exposure control cannot be carried out while the high luminance portion is accurately regarded as the main subject.

SUMMARY OF THE INVENTION

It is an object of the present invention is to provide an exposure control apparatus and method thereof capable of performing correct exposure control even when a main subject has high luminance.

The exposure control apparatus and method thereof according to the present invention determines the exposure value based on the luminance of a photographic screen and performs exposure control based on the determined exposure value. This exposure control apparatus comprises an area generating unit which divides the photographic screen into a predetermined number of areas; a deciding unit which decides, for each area generated by the area generating unit, whether a main subject having a high luminance exists within that area; an average luminance calculating unit which calculates an average luminance in the area generated by the area generating unit according to the decision result by the deciding unit; and an exposure value determining unit which determines an exposure value based on the average luminance in the area calculated by the average luminance calculating unit.

Other objects and features of this invention will become apparent from the following description with reference to the accompanying drawings.

BRIEF DESCRIPTION OF THE DRAWINGS

FIG. 4A and FIG. 4B illustrate an example of high luminance decision in a high luminance decider illustrated in FIG. 2;

DESCRIPTION OF THE PREFERRED EMBODIMENTS

Preferred embodiments of an exposure control apparatus and method thereof according to the present invention will be described hereinafter with reference to the accompanying drawings. The preferred embodiments will be described by way of an image pickup apparatus such as a digital video camera or a digital still camera, to which the present invention is applied. Furthermore, first exposure control after turning-on of a power source of the image pickup apparatus will be described below in a first preferred embodiment; and exposure control in a loop fashion by continuous processing will be described below in a second preferred embodiment.

Figure 1:
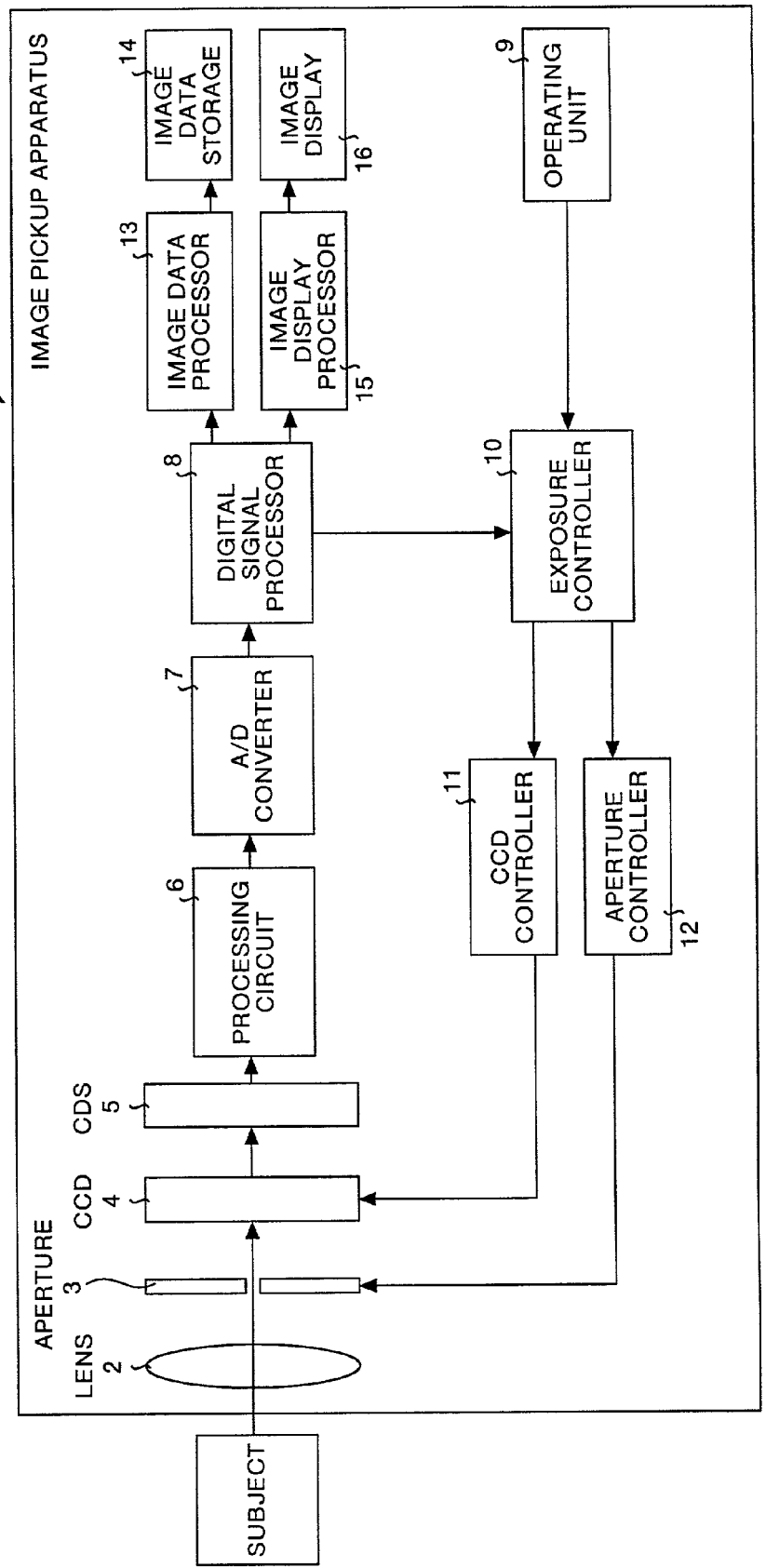
FIG. 1 is a block diagram illustrating the configuration of an image pickup apparatus, to which an exposure control apparatus in a first preferred embodiment according to the present invention is applied.

First of all, a description will be given of the configuration of an image pickup apparatus, to which the exposure control apparatus in the first preferred embodiment is applied. FIG. 1 is a block diagram illustrating the configuration of the image pickup apparatus, to which the exposure control apparatus in the first preferred embodiment according to the present invention is applied.

As illustrated in FIG. 1, the image pickup apparatus 1, to which the exposure control apparatus in the first preferred embodiment is applied, comprises lens 2, aperture 3, CCD (a charge-coupled device) 4, CDS 5, processing circuit 6, A/D converter 7, digital signal processor 8, operating unit 9, exposure controller 10, CCD controller 11, aperture controller 12, image data processor 13, image data storage 14, image display processor 15 and image display 16. Here, the exposure controller 10 corresponds to the exposure control apparatus according to the present invention.

The image pickup apparatus 1 is image input equipment by the use of an image pickup device (a charge-coupled device) such as a digital video camera or a digital still camera. The lens 2 is adapted to focus an image of a subject on the CCD 4. The aperture 3 is provided for limiting the intensity of the image of the subject. The CCD 4 is a circuit for converting the image of the subject passing through the lens 2 and the aperture 3 into an electric signal, so as to output the electric signal as an image signal. The CDS 5 is a circuit for removing noise or the like from the image signal input from the CCD 4.

The processing circuit 6 is a circuit for controlling a gain of the image signal input from the CDS 5. The A/D converter 7 is a circuit for converting the image signal input from the processing circuit 6 into a digital signal, so as to output the digital signal.

The digital signal processor 8 is a processor for subjecting the digital image signal input from the A/D converter 7 to digital image processing such as RGB signal conversion or image interpolation, so as to produce image data. Although the first embodiment exemplifies the case where the image data is transmitted to the exposure controller 10, which then detects the luminance of each pixel, the digital signal processor 8 may detect the luminance, and then, may transmit a value obtained by adding the luminance of each pixel to the exposure controller 10.

The operating unit 9 is a processor for sending an operating command entered by a user to the exposure controller 10. Here, the operating commands entered by the user include a command to start or end exposure control, a command to start or end exposure correction such as backlight correction or forward light correction, a command to select a metering system from an averaging metering system, a center-weighted metering system, a spot metering system and a multi-pattern metering system, a command to start or end continuous processing, and the like.

The exposure controller 10 is a processor for determining an exposure value based on the luminance of a photographic screen, and then, performing the exposure control based on the determined exposure value. Here, the luminance of the photographic screen (the CCD 4) is detected per pixel of the photographic screen (the CCD 4) based on the image data input from the digital signal processor 8.

The exposure controller 10 determines the exposure value, as follows: first, it is decided, at each of predetermined areas on the photographic screen, whether there is a main subject having a high luminance within that area, and then, an average luminance is calculated in accordance with the decision result; subsequently, the average luminance at each area is subjected to predetermined weighting according to the metering system, so that the average luminance of the photographic screen is calculated; and finally, the exposure value (i.e., the opening degree of the aperture 3 and/or the charge accumulating time of the CCD 4) is determined in accordance with the average luminance of the photographic screen and the sensitivity of the CCD 4.

The exposure controller 10 calculates the average luminance per area without performing any high luminance cutting when it is decided that there is a main subject having a high luminance within the area; and in contrast, the exposure controller 10 calculates the average luminance after the high luminance cutting is performed when it is decided that there is no main subject having a high luminance within the area.

The CCD controller 11 controls a shutter operation of the CCD 4 in such a manner as to accumulate and take out electric signals converted by an exposed light image based on the exposure value input from the exposure controller 10. The aperture controller 12 controls the opening degree of the aperture 2 in such a manner as to change the diameter of an optical flux incident from the lens 2 toward the CCD 4 based on the exposure value input from the exposure controller 10. An image can be exposed in various kinds of exposure conditions depending upon the controls by the CCD controller 11 and the aperture controller 12.

The image data processor 13 is adapted to subject the image data input from the digital signal processor 8 to image processing for image recording such as gamma correction or compression. The image data storage 14 is a memory for storing therein the image data in which the image processing is performed by the image data processor 13, wherein an external memory card or the like can be used.

The image display processor 15 is adapted to subject the image data input from the digital signal processor 8 to image processing for displaying an image such as gamma processing. The image display 16 is a display such as an LCD monitor for displaying the image data which is subjected to the image processing by the image display processor 15. The image display 16 can confirm whether an image is correctly exposed.

In a schematic manner, the exposure controller 10 determines the correct exposure value and controls the CCD controller 11 and/or the aperture controller 12 based on the exposure value, thereby performing the exposure. Thus, the image data storage 14 stores therein the data on the image exposed at the correct exposure value, and the image display 16 displays the data on the image exposed at the correct exposure value.

Figure 2:
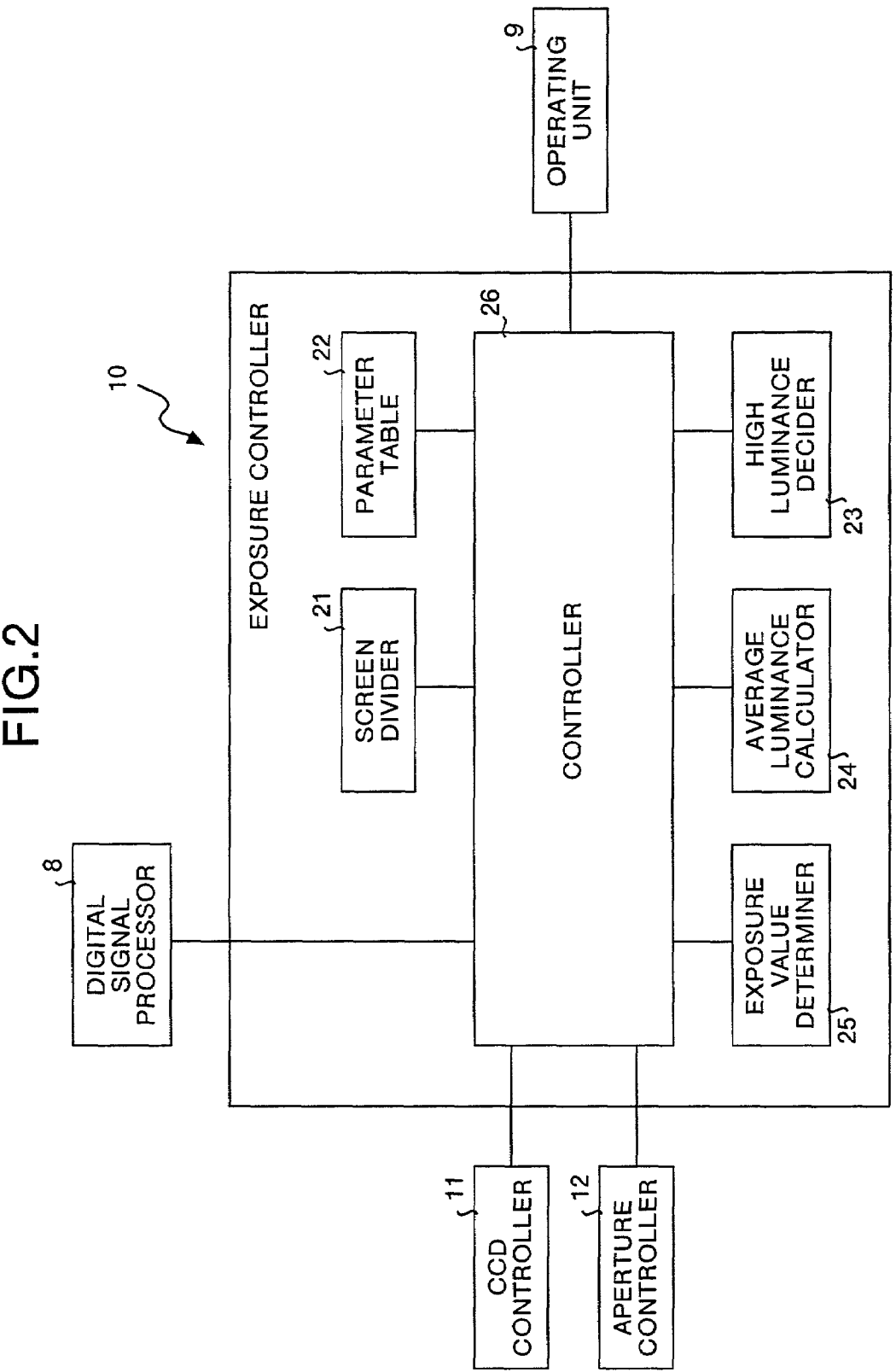
FIG. 2 is a block diagram illustrating the configuration of an exposure controller illustrated in FIG. 1.

Next, explanation will be specifically given on the configuration of the exposure controller 10 illustrated in FIG. 1. FIG. 2 is a block diagram illustrating the configuration of the exposure controller 10 illustrated in FIG. 1. This exposure controller 10 comprises screen divider 21, parameter table 22, high luminance decider 23, average luminance calculator 24, exposure value determiner 25 and controller 26.

The screen divider 21 corresponds to the area generating unit; the high luminance decider 23 corresponds to the deciding unit; the average luminance calculator 24 corresponds to the average luminance calculating unit; and the exposure value determiner 25 corresponds to the exposure value determining unit.

The screen divider 21 illustrated in FIG. 2 is a processor for dividing the photographic screen (the exposed image on the CCD 4) into predetermined areas so as to generate a plurality of areas. The plurality of areas are generated in this manner such that it is decided per area whether there is a main subject having a high luminance so as to calculate an average luminance by a calculating method according to the decision result.

Figure 3:
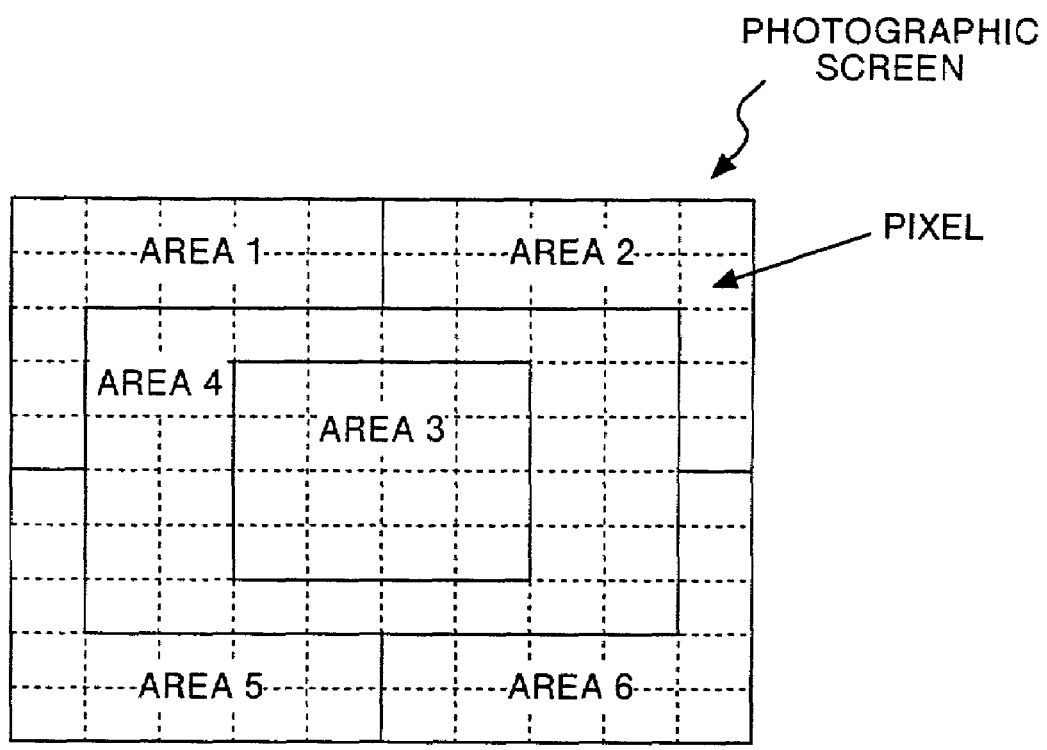
FIG. 3 illustrates an example of area generation in a screen divider illustrated in FIG. 2.

Specific explanation will be given on the generation of the areas by the screen divider 21. FIG. 3 illustrates an example of the area generation in the screen divider 21 illustrated in FIG. 2. FIG. 3 illustrates an example in which the photographic screen consisting of 10×10 pixels is divided into six areas 1 to 6. Although the area generation here exemplifies one applied to a center-weighted metering system, it is understood that different areas should be generated depending upon the metering system or the photographic conditions such as back-light or forward evaluation.

The high luminance decider 23 illustrated in FIG. 2 is adapted to decide per area generated by the screen divider 21 whether there is a main subject having a high luminance within the area. It is decided per area whether there is a main subject having a high luminance in this manner such that an average luminance is calculated depending upon high luminance cutting according to the decision result.

Specifically, the high luminance decider 23 receives the luminance Ev of each of pixels forming an area to be decided from the exposure controller 10, and then, decides whether the received luminance exceeds a predetermined luminance threshold (hereinafter referred to as "a high luminance threshold EL").

Moreover, the high luminance decider 23 counts pixels having a luminance higher than the high luminance threshold EL as high luminance pixels per area so as to calculate a high luminance pixel count value (hereinafter referred to as "a high luminance pixel count value Hn"), and further, adds the respective luminances Ev of the high luminance pixels so as to calculate a luminance sum He in the high luminance area. Namely, the high luminance pixel count value Hn and the luminance sum He in the high luminance area are calculated as follows:

High luminance pixel count value $Hn=Hn+1$

Luminance sum He in the high luminance area$=He+Ev$

Additionally, the high luminance decider 23 counts pixels having a luminance equal to or lower than the high luminance threshold EL as normal luminance pixels per area so as to calculate a normal luminance pixel count value Nn, and further, adds the respective luminances Ev of the normal luminance pixels so as to calculate a luminance sum Ne in the normal luminance area. Namely, the normal luminance pixel count value Nn and the luminance sum Ne in the normal luminance area are calculated as follows:

Normal luminance pixel count value $Nn=Nn+1$

Luminance sum Ne in the normal luminance area$=Ne+Ev$

Furthermore, the high luminance decider 23 decides whether the calculated high luminance pixel count value Hn exceeds a predetermined count threshold (hereinafter referred to as "a count threshold Th1"), thereby deciding whether the main subject exists within the area to be decided.

Moreover, the high luminance decider 23 sends the high luminance pixel count value Hn, the luminance sum He in the high luminance area, the normal luminance pixel count value Nn, the luminance sum Ne in the normal luminance area and the decision result of whether the high luminance pixel count value exceeds the count threshold to the average luminance calculator 24 via the controller 26.

Here, a description will be specifically given of the high luminance decision in the high luminance decider 23. FIG. 4 illustrates an example of the high luminance decision in the high luminance decider 23 illustrated in FIG. 2. FIG. 4 exemplifies the high luminance decision in which the count threshold Th1 of the area 3 consisting of 16 pixels in total is eight (50%).

In the case illustrated in FIG. 4A, the high luminance pixel count value Hn in the area 3 is calculated to be three. Since Hn (=3) is smaller than the count threshold Th1 (=8), it is decided that the high luminance pixel in the area 3 (the high luminance area) is not a main subject.

In contrast, in the case illustrated in FIG. 4B, the high luminance pixel count value Hn in the area 3 is calculated to be 12. Since Hn (=12) is greater than the count threshold Th1 (=8), it is decided that the high luminance pixel in the area 3 (the high luminance area) is a main subject.

The average luminance calculator 24 illustrated in FIG. 2 is a calculator for calculating the average luminance per area according to the decision result by the high luminance decider 23. In the case where the high luminance decider 23 decides that the main subject of the high luminance exists in the area, it calculates the average luminance without performing any high luminance cutting. In contrast, when the high luminance decider 23 decides that no main subject of the high luminance exists in the area, it calculates the average luminance after performing the high luminance cutting.

Specifically, the average luminance calculator 24 calculates an average luminance Mev by using the luminance per se of the high luminance pixel (i.e., the luminance sum He in the high luminance area) in the area whose average luminance is to be calculated when the high luminance decider 23 decides that the main subject of the high luminance exists in the area.

Namely, when the high luminance decider 23 decides that the high luminance pixel count value Hn exceeds the count threshold Th1, correct exposure is carried out while the high luminance area can be accurately taken as the main subject, and therefore, the average luminance Mev can be calculated as follows:

Total luminance sum *Ne* within area=*Ne+He*

Total pixel count value *Nn* within area=*Nn+Hn*

Average luminance *Mev* within area=*Ne/Nn*

In the meanwhile, the average luminance calculator 24 calculates an average luminance Mev by substituting a predetermined low luminance equal to or lower than the count threshold EL (hereinafter referred to as "a substituted low luminance Dev") for the luminance of the high luminance pixel in the area whose average luminance is to be calculated when the high luminance decider 23 decides that no main subject of the high luminance exists in the area.

Namely, when the high luminance decider 23 decides that the high luminance pixel count value Hn is equal to or lower than the count threshold Th1, the average luminance Mev is calculated below such that the correct exposure is carried out by the high luminance cutting:

Total luminance sum *Ne* within area=*Ne+Dev·Hn*

Total pixel count value *Nn* within area=*Nn+Hn*

Average luminance *Mev* within area=*Ne/Nn*

Although the substituted low luminance Dev is the luminance equal to or lower than the count threshold EL in the first embodiment, the average luminance Mev may be calculated by using only the luminance sum Ne in the normal luminance area, wherein the substituted low luminance Dev may be set to zero.

The parameter table 22 illustrated in FIG. 2 is a memory for storing therein, as a group of parameters, the luminance threshold EL to be used for the decision by the high luminance decider 23, the count threshold Th1 to be used for the decision by the high luminance decider 23 and the substituted low luminance Dev to be used for the calculation of the average luminance by the average luminance calculator 24.

The parameter table 22 may store therein a plurality of groups of parameters consisting of different luminance thresholds EL, different count thresholds Th1 and different substituted low luminances Dev according to the exposure conditions. For example, the parameter table 22 may store therein different count thresholds Th1 and different substituted low luminances Dev for the normal exposure evaluation and the exposure evaluation for exposure correction (such as back-light or forward correction) after the normal exposure evaluation, respectively, thereby achieving correct exposure control in each of the exposure conditions.

Otherwise, the parameter table 22 may store therein a plurality of groups of parameters consisting of different luminance thresholds EL, different count thresholds Th1 and different substituted low luminances Dev in each of the areas generated by the screen divider 21. For example, the parameter table 22 may store therein the substituted low luminances Dev in the areas 3 and 4 illustrated in FIG. 3 as being lower than the substituted low luminances Dev in the areas 1, 2, 5 and 6 (or as being 0) in the case of the normal exposure evaluation, thereby calculating the average luminance of the photographic screen by placing prime importance on the average luminance of the areas 3 and 4 in the center-weighted metering system.

In another example, the parameter table 22 may store therein the substituted low luminances Dev in the areas 3 and 4 illustrated in FIG. 3 as being lower than the substituted low luminances Dev in the areas 1, 2, 5 and 6 (or as being 0) in the case of the exposure evaluation for the back-light correction, thereby comparing the average luminances of the areas 1 and 2 with the average luminance of the area 3 so as to achieve the correct exposure evaluation for the back-light correction.

In a further example, the parameter table 22 may store therein different luminance thresholds EL, different count thresholds Th1 and different substituted low luminances Dev in the areas, respectively, according to the metering system such as an averaging metering system, a center-weighted metering system, a spot metering system or a multi-pattern metering system, thereby calculating the average luminance of the photographic screen without performing any predetermined weighting with respect to the average luminance in each of the areas according to the metering system.

Additionally, the parameter table 22 may store therein a plurality of different substituted low luminances Dev in each of the parameter groups. For example, the parameter table 22 may store therein different substituted low luminances Dev in such a manner as to correspond to the high luminance pixel count values Hn, so that the average luminance without any great difference is calculated between the case where the high luminance pixel count value Hn slightly exceeds the count threshold Th1 and the case where the high luminance pixel count value Hn does not slightly exceed the count threshold Th1, thereby preventing any abrupt exposure change.

The exposure value determiner 25 illustrated in FIG. 2 is a processor for determining an exposure value based on the average luminance in each of the areas calculated by the average luminance calculator 24. Specifically, the average luminance Mev calculated in each of the areas is subjected to predetermined weighting according to the metering system (an averaging metering system, a center-weighted metering system, a spot metering system or a multi-pattern metering system), thereby calculating the average luminance of the photographic screen so as to determine the exposure value (i.e., the opening degree of the aperture 3 and/or the charge accumulating time of the CCD 4) according to the average luminance of the photographic screen and the sensitivity of the CCD 4.

The controller 26 illustrated in FIG. 2 is a processor for controlling the constituents in the exposure controller 10. Specifically, the controller 26 inputs or outputs various kinds of data to or from the screen divider 21, the parameter table 22, the high luminance decider 23, the average luminance calculator 24 and the exposure value determiner 25.

Furthermore, the controller 26 detects the luminance of each of the pixels based on the image data which are input from the digital signal processor 8, outputs the luminance to the high luminance decider 23 per area, and then, decides whether the high luminance decider 23 inputs the luminance of each of the pixels within the area. Moreover, the controller 26 decides whether the average luminance calculator 24 calculates the average luminance of all of the areas of the photographic screen.

Additionally, the controller 26 controls each of the constituents of the exposure controller 10 based on operating commands input via the operating unit 9 by a user, including a command to start or end the exposure control, a command to start or end the exposure correction such as the back-light correction or the forward light correction, a command to select the metering system from the averaging metering system, the center-weighted metering system, the spot metering system and the multi-pattern metering system, a command to start or end the continuous processing, and the like.

In addition, the controller 26 outputs the exposure value input from the exposure value determiner 25 to the CCD controller 11 and the aperture controller 12, thereby controlling the CCD controller 11 and/or the aperture controller 12 based on the exposure value, so as to carry out the exposure.

Figure 5B:
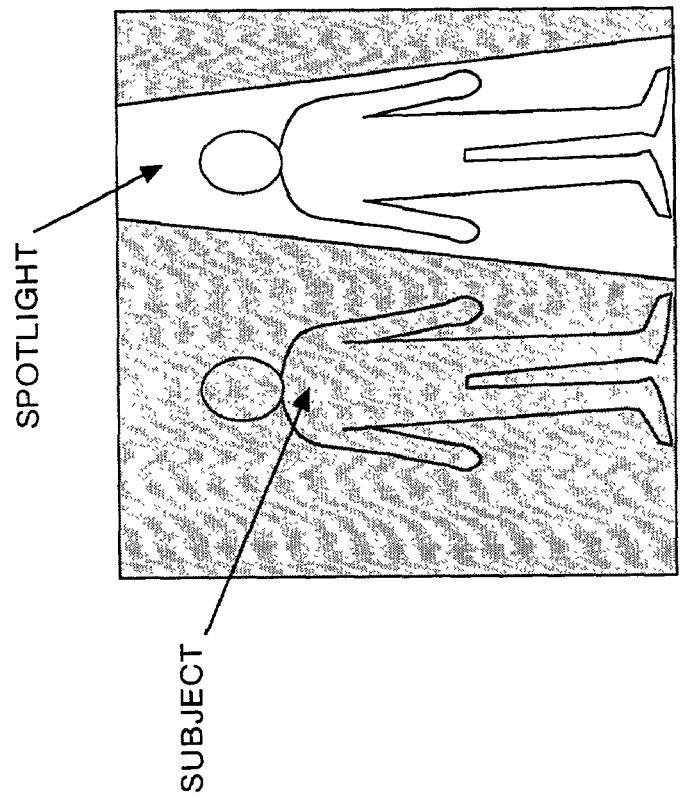
FIG. 5A and FIG. 5B illustrate an example of an exposure control effect in the exposure controller illustrated in FIG. 2.
Figure 5A:
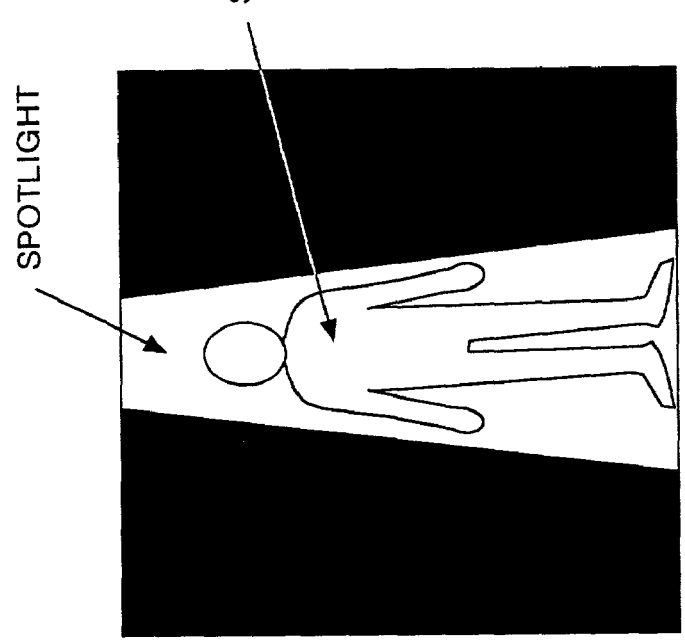

Here, a specific explanation will be given on the effect of the exposure control by the exposure controller 10. FIG. 5A and FIG. 5B illustrate an example of the exposure control effect in the exposure controller 10 illustrated in FIG. 2. FIG. 5A exemplifies the exposure effect when a person illuminated with a spotlight is at the center of the photographic screen; and FIG. 5B exemplifies the exposure effect when a person not illuminated with a spotlight is at the center of the photographic screen.

In the case illustrated in FIG. 5A, there are many high luminance portions at the center of the photographic screen, so that the high luminance decider 23 decides that the person at the center is the main subject of the high luminance. Consequently, the average luminance calculator 24 calculates the average luminance at the center without performing any high luminance cutting, thereby achieving the correct exposure in which the person at the center can be accurately regarded as the main subject.

In contrast, in the case illustrated in FIG. 5B, there are few high luminance portions at the center of the photographic screen, so that the high luminance decider 23 decides that the person at the center is not the main subject of the high luminance. Consequently, the average luminance calculator 24 performs the high luminance cutting so as to calculate the average luminance at the center, thereby achieving the correct exposure while the entire photographic screen can be prevented from coming into under-exposure.

Figure 6:
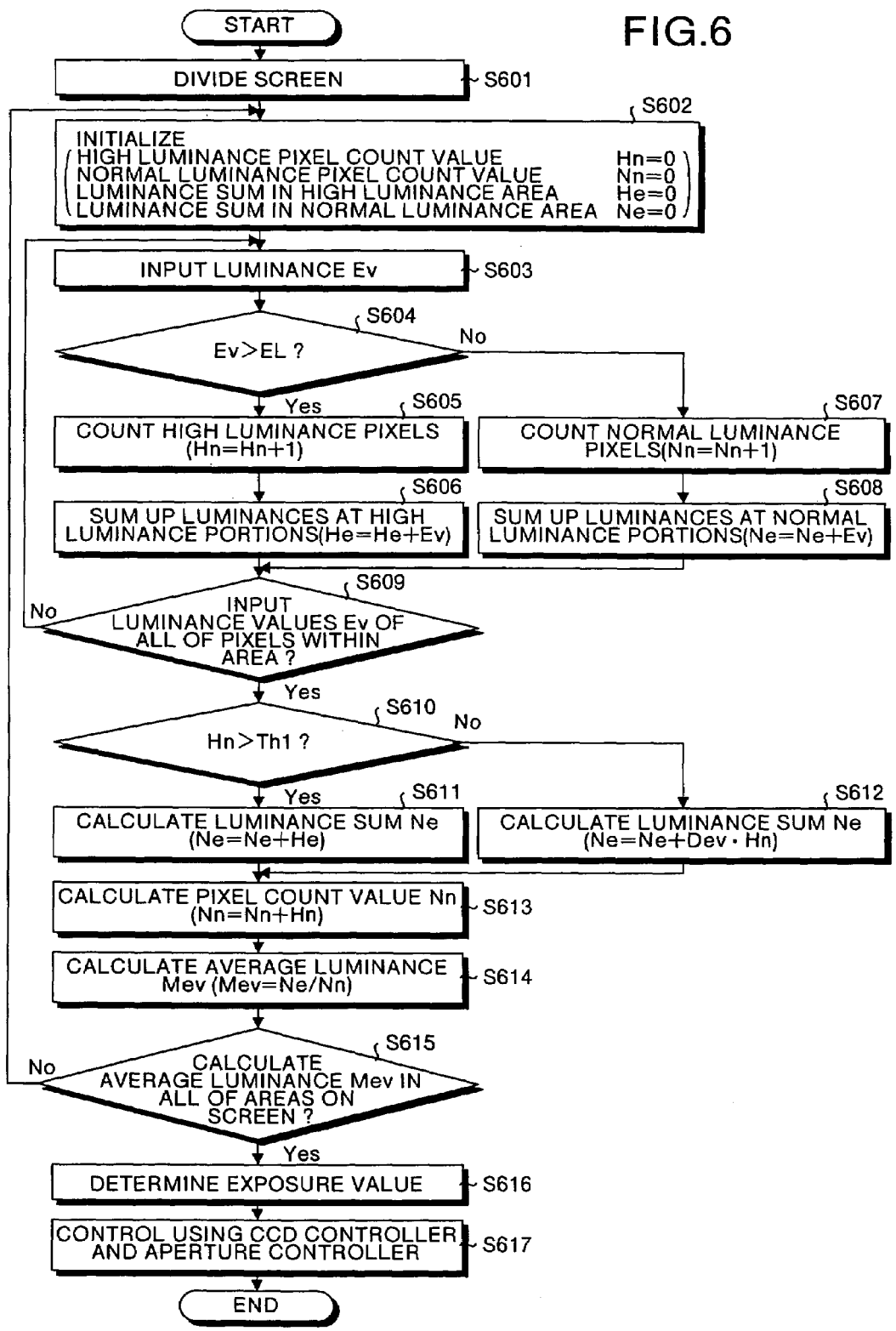
FIG. 6 is a flow chart illustrating exposure control procedures in the exposure controller illustrated in FIG. 2.

Subsequently, a description will be specifically given of exposure control procedures in the exposure controller 10 such configured as described above. FIG. 6 is a flow chart illustrating the exposure control procedures in the exposure controller 10 illustrated in FIG. 2. As illustrated in FIG. 6, first of all, the exposure controller 10 controls the screen divider 21 in such a manner as to divide the photographic screen into the predetermined areas so as to generate the plurality of areas (step S601). Next, the high luminance decider 23 initializes the high luminance pixel count value Hn, the luminance sum He in the high luminance area, the normal luminance pixel count value Nn and the luminance sum Ne in the normal luminance area of the area to be decided (step S602).

The controller 26 inputs the luminance Ev with respect to a pixel to be decided whether the pixel is a high luminance pixel (step S603), and then, it is decided whether the input luminance Ev exceeds the high luminance threshold EL (step S604).

If it is decided that the input luminance Ev exceeds the high luminance threshold EL (the result in step S604 is affirmative), the high luminance pixels are counted (step S605), so that the luminances at the high luminance portions are summed up (step S606). To the contrary, if it is decided that the input luminance Ev is equal to or smaller than the high luminance threshold EL (the result in step S604 is negative), the normal luminance pixels are counted (step S607), so that the luminances at the normal luminance portions are summed up (step S608). Incidentally, the routine may be processed in parallel in steps S605 and S606, and further, the routine may be processed in parallel in steps S607 and S608.

The controller 26 decides whether the high luminance decider 23 inputs the luminances Ev of all of the pixels within the area to be decided (step S609). If it is decided that the high luminance decider 23 does not input the luminances Ev of all of the pixels within the area to be decided (the result in step S609 is negative), the routine returns to step S603, in which the high luminance decider 23 inputs the luminance Ev of a subsequent pixel (step S603).

In the meanwhile, if it is decided that the high luminance decider 23 inputs the luminances Ev of all of the pixels within the area to be decided (the result in step S609 is affirmative), the high luminance decider 23 decides whether the high luminance pixel count value Hn exceeds the count threshold Th1 (step S610).

If it is decided that the high luminance pixel count value Hn exceeds the count threshold Th1 (the result in step S610 is affirmative), the average luminance calculator 24 calculates the luminance sum Ne of all of the pixels within the area by using the luminance sum He in the high luminance area (step S611). To the contrary, if it is decided that the high luminance pixel count value Hn is equal to or smaller than the count threshold Th1 (the result in step S610 is negative), the average luminance calculator 24 substitutes the substituted low luminance Dev for the luminance of the high luminance pixel, and then, calculates the luminance sum Ne of all of the pixels within the area (step S612).

Thereafter, the average luminance calculator 24 calculates the count value Nn of all of the pixels within the area by adding the high luminance pixel count value Hn and the normal luminance pixel count value Nn (step S613), and then, calculates the average luminance Mev by dividing the luminance sum Ne by the count value Nn (step S614).

The controller 26 decides whether the average luminance calculator 24 calculates the average luminance Mev in all of the areas on the photographic screen (step S615). If it is decided that the average luminance calculator 24 does not calculate the average luminance Mev in all of the areas (the result in step S615 is negative), the routine returns to step S602, in which initialization is carried out with respect to a subsequent area (step S602). Although the average luminance Mev is calculated in sequence with respect to each of the areas in this embodiment, the average luminance Mev may be calculated in parallel with respect to each of the areas.

In step S615, if it is decided that the average luminance calculator 24 calculates the average luminance Mev in each of the areas on the photographic screen (the result in step S615 is affirmative), the exposure value determiner 25 determines the exposure value based on the average luminance Mev in each of the areas (step S616). The controller 26 controls the CCD controller 11 and the aperture controller 12 based on the exposure value, so as to carry out the correct exposure (step S617), thereby completing the exposure control processing (END).

As described above, in the first embodiment, the screen divider 21 divides the photographic screen into the predetermined areas so as to generate the plurality of areas; the high luminance deciders 23 decides, per area generated by the screen divider 21, whether the main subject having the high luminance exists within the area; the average luminance calculator 24 calculates the average luminance per area according to the decision result by the high luminance deciders 23; the exposure value determiner 25 determines the exposure value based on the average luminance in the area calculated by the average luminance calculator 24; and the controller 26 controls the CCD controller 11 and the aperture controller 12 based on the exposure value determined by the exposure value determiner 25, so as to achieve the exposure. Consequently, it is decided whether the high luminance portion is the main subject, thereby achieving the correct exposure control even when the main subject has a high luminance.

Furthermore, the high luminance decider 23 counts, per area, the pixel having a luminance higher than the high luminance threshold as the high luminance pixel, so as to calculate the high luminance pixel count value, and further, decides whether the calculated high luminance pixel count value exceeds the count threshold; and the average luminance calculator 24 calculates, per area, the average luminance by using the luminance per se of the high luminance pixel (the luminance sum in the high luminance area) when the high luminance decider 23 decides that the high luminance pixel count value exceeds the count threshold, in contrast, the average luminance calculator 24 substitutes the substituted low luminance for the luminance of the high luminance pixel so as to calculate the average luminance when the high luminance decider 23 decides that the high luminance pixel count value is equal to or smaller than the count threshold. Consequently, it is accurately decided whether the high luminance portion is the main subject, thereby achieving the correct exposure control even when the main subject has a high luminance.

Moreover, the parameter table 22 stores the different luminance thresholds, the different count thresholds and the different substituted low luminances (the luminance thresholds for use in deciding in the high luminance decider 23, the count thresholds for use in deciding in the high luminance decider 23 and the substituted low luminances for use in calculating the average luminance in the average luminance calculator 24) in the plurality of parameter groups in such a manner as to correspond to the exposure conditions (such as the normal exposure evaluation or the exposure evaluation of the back-light correction), and further, the high luminance decider 23 and the average luminance calculator 24 select the parameter group according to the exposure condition. Consequently, it is possible to achieve the correct exposure control even when the exposure correction such as the back-light correction or the forward light correction is carried out.

Additionally, the different luminance thresholds, the different count thresholds and the different substituted low luminances per area generated by the screen divider 21 are stored in the plurality of parameter groups in the parameter table 22 in such a manner as to correspond to the exposure condition (the metering system such as the averaging metering system, the center-weighted metering, the spot metering system or the multi-pattern metering system), and the high luminance decider 23 and the average luminance calculator 24 select the parameter group according to the exposure condition and the area. Consequently, it is possible to achieve the correct exposure control according to the exposure condition such as the metering system.

Furthermore, the parameter table 22 stores, in each of the parameter groups, the plurality of different substituted low luminances in such a manner as to correspond to the high luminance pixel count value, and further, the average luminance calculator 24 selects the substituted low luminance according to the high luminance pixel count value. Consequently, it is possible to allow the transition from the state in which the high luminance cutting is performed to the state in which no high luminance cutting is performed, thereby achieving stable exposure control.

Although the description has been given of the first exposure control carried out immediately after the turning-on of the power source in the image pickup apparatus 1 in the first embodiment, the present invention is not limited to the above-described embodiment but applied to exposure in a loop fashion by continuous processing so as to achieve correct exposure control. In view of this, a description will be given below of exposure control in a loop fashion by continuous processing in a second embodiment. Incidentally, constituents having the same functions as those of the constituents illustrated in the first embodiment are designated by the same reference numerals, and therefore, their explanation will be omitted.

An image pickup apparatus 1 in the second embodiment determines a correct exposure value by rough or fine adjustment after turning-on of a power source, resetting or completion of image exposure. In order to display an image all the time on an image display 16 under correct exposure or cope with a change in image angle, the exposure control is continued in a loop fashion by continuous processing.

Now, explanation will be given on a change in exposure condition by the continuous processing. FIG. 7A to FIG. 7C and FIG. 8A to FIG. 8C illustrate examples of changes in exposure condition by the continuous processing. The exposure condition is changed from FIG. 7A or FIG. 8A to FIG. 7C or FIG. 8C, in which each of left graphs illustrates a picked-up image, and each of right graphs illustrates luminance distribution on a horizontal line passing the center of the picked-up image.

Figure 7A:
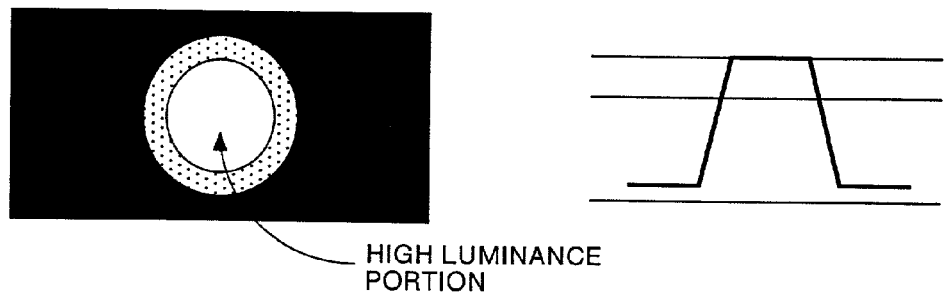
FIG. 7A to FIG. 7C illustrate an example of a change in exposure condition by continuous processing.
Figure 7B:
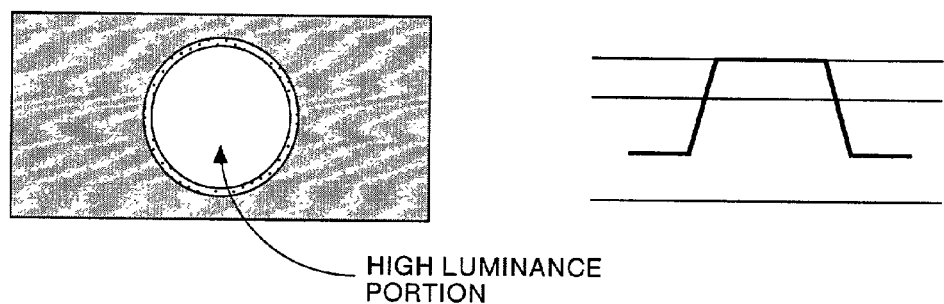
Figure 7C:

Since a high luminance portion is small in the state illustrated in FIG. 7A, high luminance cutting is carried out, so that the high luminance portion becomes larger than that illustrated in FIG. 7A by changing exposure as illustrated in FIG. 7B. At this time, if the high luminance portion is small in the state illustrated in FIG. 7B, the exposure is stabilized in the state illustrated in FIG. 7B. In contrast, if the high luminance portion is large, the high luminance cutting is carried out, the exposure is stabilized by changing the exposure as illustrated in FIG. 7C.

Figure 8A:
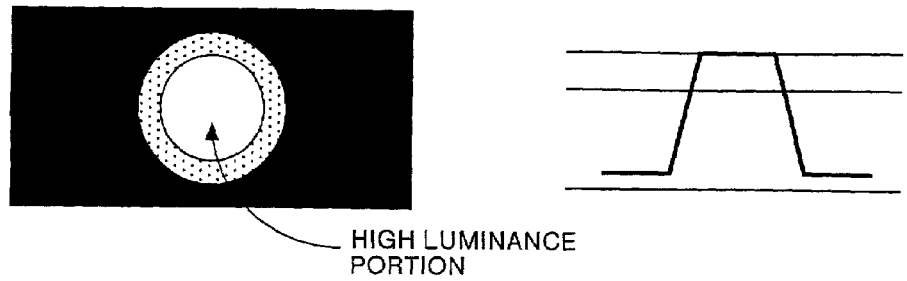
FIG. 8A to FIG. 8C illustrate another example of a change in exposure condition by the continuous processing.
Figure 8B:
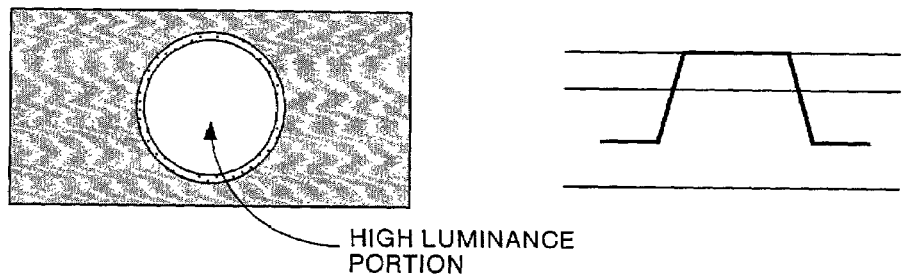
Figure 8C:
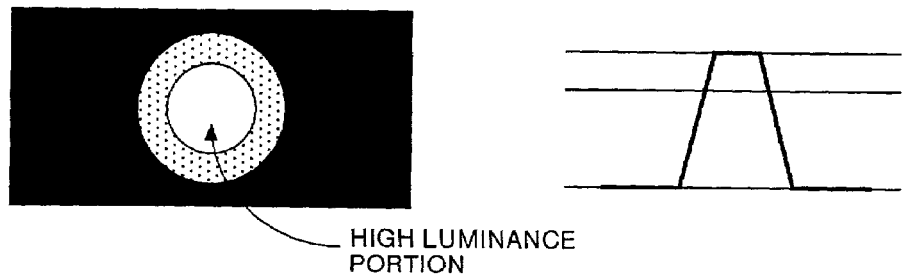

However, there arises a problem when the high luminance portion is very high in luminance in the state illustrated in FIG. 7B. Such a condition is illustrated in FIG. 8A to FIG. 8C. The transition from FIG. 8A to FIG. 8C is the same as that from FIG. 7A to FIG. 7C. If the high luminance portion is small in the state illustrated in FIG. 8C, the high luminance cutting is carried out, so that the exposure is changed into the state illustrated in FIG. 8B, resulting in an unstable state (a hunting state) in which the state illustrated in FIG. 8B and the state illustrated in FIG. 8C are repeated. This phenomenon is liable to occur particularly when the substituted low luminance is set to zero.

In order to cope with such a hunting state, the image pickup apparatus 1 in the second embodiment is configured such that a parameter table 22 stores therein a plurality of different count thresholds in a group of parameters and a high luminance decider 23 selects a count threshold according to the exposure condition in the exposure controller 10.

Specifically, the high luminance decider 23 catches the exposure condition by deciding whether a high luminance pixel count value is zero in previous exposure control, or whether a high luminance pixel count value exceeds a count threshold in the previous exposure control (that is, whether the high luminance cutting is carried out in the previous exposure control), and then, selects a count threshold according to the exposure condition from the parameter table 22.

Namely, if the previous high luminance pixel count value is zero, the high luminance decider 23 selects a count threshold Th11; if the previous high luminance pixel count value is not zero and the high luminance cutting is carried out, the high luminance decider 23 selects a count threshold Th12; and if the previous high luminance pixel count value is not zero and the high luminance cutting is not carried out, the high luminance decider 23 selects a count threshold Th13. Here, it is preferable that Th11<Th12≦Th13.

Figure 9:
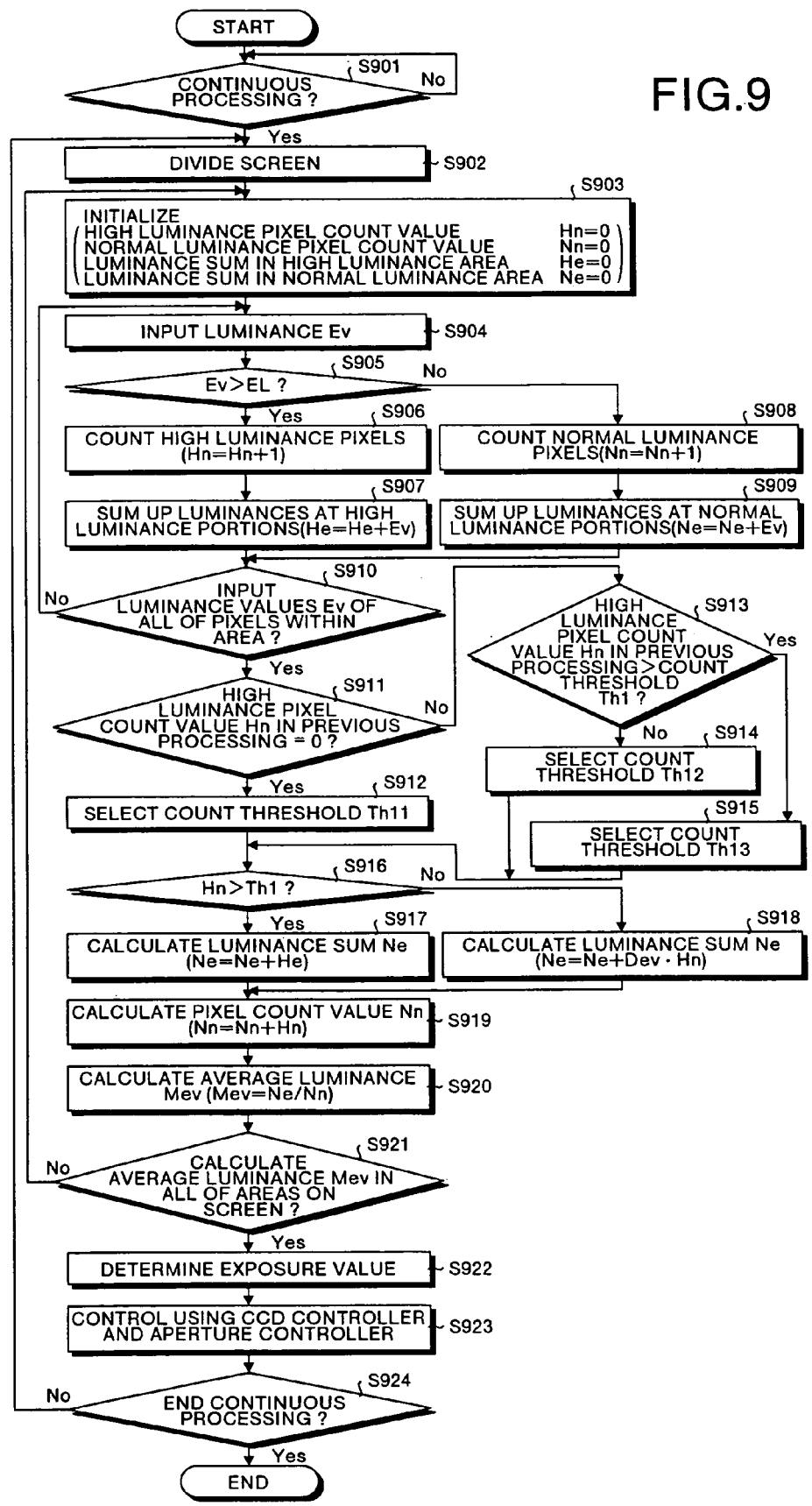
FIG. 9 is a flow chart illustrating exposure control procedures in an image pickup apparatus 1 in a second preferred embodiment according to the present invention.
Figure 10A:
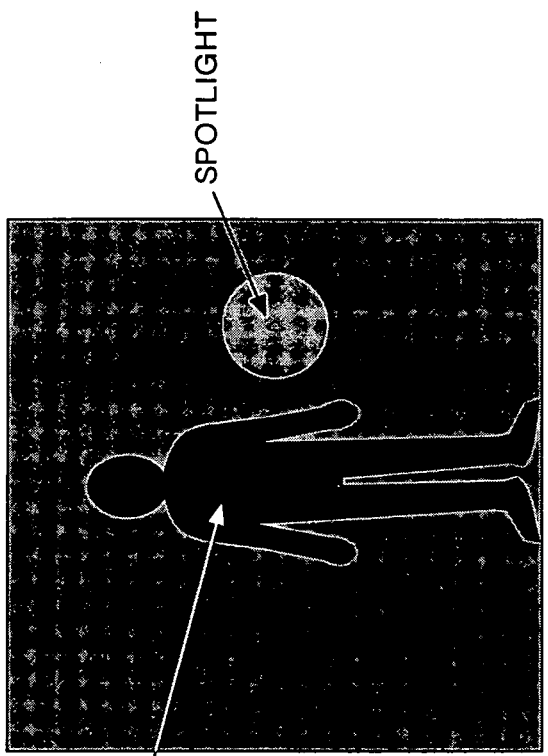
FIG. 10A and FIG. 10B illustrate an example of exposure control in the prior art.
Figure 10B:
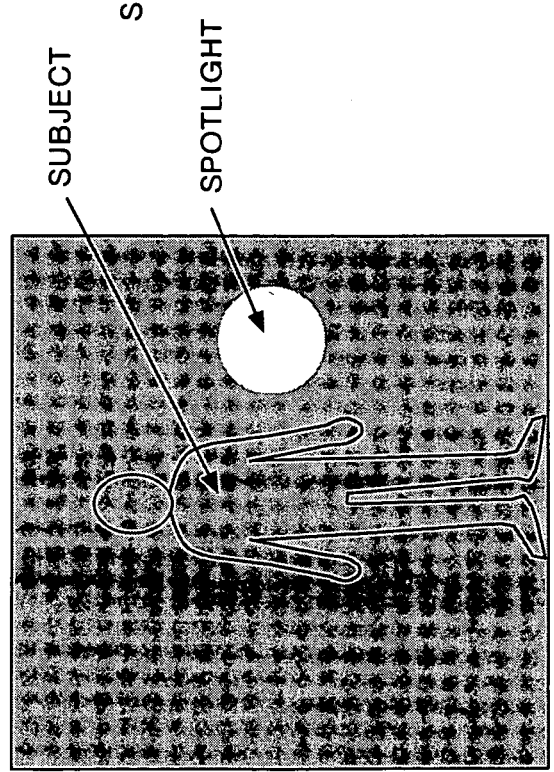

Next, specific explanation will be given on the exposure control procedures in the image pickup apparatus 1 in the second embodiment such configured as described above. FIG. 9 is a flow chart illustrating the exposure control procedures in the image pickup apparatus 1 in the second embodiment according to the present invention. As illustrated in FIG. 9, in the image pickup apparatus 1, a controller 26 inside the exposure controller 10 decides whether the continuous processing is to be performed (step S901). If it is decides that the continuous processing is to be performed (the result in step S901 is affirmative), the continuous processing is started. Here, the explanation will be given below on the assumption that the previous exposure control has been finished.

Specifically, first of all, in another exposure control, the exposure controller 10 controls a screen divider 21 in such a manner as to divide a photographic screen into predetermined areas so as to generate a plurality of areas (step S902). Next, the high luminance decider 23 initializes a high luminance pixel count value Hn, a luminance sum He in a high luminance area, a normal luminance pixel count value Nn and a luminance sum Ne in a normal luminance area of the area to be decided (step S903).

The controller 26 inputs a luminance Ev of a pixel to be decided whether the pixel is a high luminance pixel (step S904), and then, it is decided whether the input luminance Ev exceeds a high luminance threshold EL (step S905).

If it is decided that the input luminance Ev exceeds the high luminance threshold EL (the result in step S905 is affirmative), the high luminance pixels are counted (step S906), so that the luminances at the high luminance portions are summed up (step S907). To the contrary, if it is decided that the input luminance Ev is equal to or smaller than the high luminance threshold EL (the result in step S905 is negative), the normal luminance pixels are counted (step S908), so that the luminances at the normal luminance portions are summed up (step S909). Incidentally, the routine may be processed in parallel in steps S906 and S907, and further, the routine may be processed in parallel in steps S908 and S909.

The controller 26 decides whether the high luminance decider 23 inputs the luminances Ev of all of the pixels within the area to be decided (step S910). If it is decided that the high luminance decider 23 does not input the luminances Ev of all of the pixels within the area to be decided (the result in step S910 is negative), the routine returns to step S904, in which the high luminance decider 23 inputs the luminance Ev of a subsequent pixel (step S904).

In the meanwhile, if it is decided that the high luminance decider 23 inputs the luminances Ev of all of the pixels within the area to be decided (the result in step S910 is affirmative), the high luminance decider 23 decides whether the high luminance pixel count value Hn in the previous exposure control was zero (step S911). If it is decided that the high luminance pixel count value Hn was zero (the result in step S911 is affirmative), the count threshold Th11 is selected (step S912).

In the meanwhile, if it is decided that the high luminance pixel count value Hn is equal to or greater than one (the result in step S911 is negative), it is decided whether the high luminance pixel count value Hn in the previous exposure control exceeds the count threshold (step S913). If it is decided that the high luminance pixel count value Hn is equal to or smaller than the count threshold (the result in step S913 is negative), the count threshold Th12 is selected (step S914). To the contrary, if it is decided that the high luminance pixel count value Hn exceeds the count threshold (the result in step S913 is affirmative), the count threshold Th13 is selected (step S915).

The high luminance decider 23 compares the selected count threshold Th1 with the high luminance pixel count value Hn, and then, decides whether the high luminance pixel count value Hn exceeds the count threshold Th1 (step S916).

If it is decided that the high luminance pixel count value Hn exceeds the count threshold Th1 (the result in step S916 is affirmative), an average luminance calculator 24 calculates the luminance sum Ne of all of the pixels within the area by using the luminance sum He in the high luminance area (step S917). To the contrary, if it is decided that the high luminance pixel count value Hn is equal to or smaller than the count threshold Th1 (the result in step S916 is negative), the average luminance calculator 24 substitutes a substituted low luminance Dev for the luminance of the high luminance pixel, and then, calculates the luminance sum Ne of all of the pixels within the area (step S918).

Thereafter, the average luminance calculator 24 calculates the count value Nn of all of the pixels within the area by adding the high luminance pixel count value Hn and the normal luminance pixel count value Nn (step S919), and then, calculates an average luminance Mev by dividing the luminance sum Ne by the count value Nn (step S920).

The controller 26 decides whether the average luminance calculator 24 calculates the average luminance Mev in all of the areas on the photographic screen (step S921). If it is decided that the average luminance calculator 24 does not calculate the average luminance Mev in all of the areas (the result in step S921 is negative), the routine returns to step S903, in which initialization is carried out with respect to a subsequent area (step S903). Although the average luminance Mev is calculated in sequence with respect to each of the areas in this embodiment, the average luminance Mev may be calculated in parallel with respect to each of the areas.

In step S921, if it is decided that the average luminance calculator 24 calculates the average luminance Mev in each of the areas on the photographic screen (the result in step S921 is affirmative), an exposure value determiner 25 determines the exposure value based on the average luminance Mev in each of the areas (step S922). The controller 26 controls a CCD controller 11 and an aperture controller 12 based on the exposure value, so as to carry out the correct exposure (step S923).

The controller 26 decides whether the continuous processing is ended (step S924). If it is decided that the continuous processing is not to be ended (the result in step S924 is negative), the routine returns to step S902, in which another exposure control is carried out (step S902). To the contrary, if it is decided that the continuous processing is to be ended (the result in step S924 is affirmative), the continuous processing is ended (END).

As described above, in the second embodiment, the parameter table 22 in the exposure controller 10 stores the plurality of different count thresholds in the parameter groups, and the high luminance decider 23 selects the count value according to the exposure condition. Consequently, it is possible to achieve the stable exposure control even when continuous processing is performed.

Thus, according to the exposure control apparatus and method of this invention, it is possible to decide whether the high luminance portion is the main subject, thereby achieving the correct exposure control even when the main subject has a high luminance. Furthermore, it is possible to perform correct exposure control even when the exposure correction such as the back-light correction or the forward light correction is carried out. Furthermore, it is possible to perform correct exposure control based on the exposure condition such as a metering system. Furthermore, it is possible to perform smooth transition from the state in which high luminance cutting is performed to the state in which no high luminance cutting is performed, thereby achieving stable exposure control. Furthermore, it is possible to perform stable exposure control even when continuous processing is performed.

The present document incorporates by reference the entire contents of Japanese priority document, 2000-128284 filed in Japan on Apr. 27, 2000.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An exposure control apparatus configured to determine an exposure value based on a luminance of a photographic screen and to perform exposure control based on a determined exposure value, said exposure control apparatus comprising:
   an area generating unit configured to divide the photographic screen into a predetermined number of areas;
   a deciding unit configured to decide, for each area generated by said area generating unit, whether a main subject having a luminance higher than a predetermined luminance threshold exists within the areas;
   an average luminance calculating unit configured to calculate an average luminance in an area generated by the area generating unit according to a decision result by said deciding unit; and
   an exposure value determining unit configured to determine an exposure value based on the average luminance calculated by said average luminance calculating unit,
   wherein said deciding unit counts pixels, each pixel having a luminance higher than the predetermined luminance threshold, out of pixels forming the area and decides whether the count value of high luminance pixels exceeds a predetermined count threshold, and
   said average luminance calculating unit calculates the average luminance by using luminance per se of the high luminance pixel when the deciding unit decides that the high luminance pixel count value exceeds the predetermined count threshold; in contrast, said average luminance calculating unit substitutes a predetermined low luminance smaller than the predetermined luminance threshold for a luminance of the high luminance pixel so as to calculate the average luminance when the deciding unit decides that the high luminance pixel count value is equal to or smaller than the predetermined count threshold.

2. The exposure control apparatus according to claim 1, further comprising a parameter table configured to store therein a plurality of parameter groups, each of which includes the predetermined luminance threshold, the predetermined count threshold and the predetermined low luminance,
   wherein said deciding unit and said average luminance calculating unit select the parameter group according to an exposure condition.

3. The exposure control apparatus according to claim 2, wherein the parameter group per area generated by said area generating unit is stored in the parameter table, and said deciding unit and said average luminance calculating unit select the parameter group according to the area generated by said area generating unit.

4. The exposure control apparatus according to claim 2, wherein said parameter table stores a plurality of low luminances in the parameter groups, and said average luminance calculating unit selects the low luminance according to the high luminance pixel count value.

5. The exposure control apparatus according to claim 3, wherein said parameter table stores a plurality of low luminances in the parameter groups, and said average luminance calculating unit selects the low luminance according to the high luminance pixel count value.

6. The exposure control apparatus according to claim 2, wherein said parameter table stores a plurality of count thresholds in the parameter groups, and said deciding unit selects the count value according to the exposure condition.

7. The exposure control apparatus according to claim 3, wherein said parameter table stores a plurality of count thresholds in the parameter groups, and said deciding unit selects the count value according to the exposure condition.

8. An exposure control method that determines an exposure value based on the luminance of a photographic screen and performs exposure control based on the determined exposure value, said exposure control method comprising:
   dividing the photographic screen into a predetermined number of areas;
   deciding, for each area, whether a main subject having a luminance higher than a predetermined luminance threshold exists within that area;
   calculating an average luminance in each area according to a decision result of said deciding; and
   determining an exposure value based on the average luminance in the area calculated in said calculating,
   wherein said deciding counts pixels, each pixel having a luminance higher than the predetermined luminance threshold, out of pixels forming the area and decides whether a count value of the high luminance pixels exceeds a predetermined count threshold, and
   said calculating further calculates an average luminance by using luminance per se of a high luminance pixel when the deciding decides that a high luminance pixel count value exceeds a predetermined count threshold; in contrast, said average luminance calculating substitutes a predetermined low luminance smaller than the predetermined luminance threshold for the luminance of the high luminance pixel so as to calculate the average luminance when the deciding decides that the high luminance pixel count value is equal to or smaller than the predetermined count threshold.

* * * * *